June 11, 1957 D. FISKE 2,795,003
WINDOW WIPER FOR MOTOR VEHICLES
Filed Dec. 5, 1952
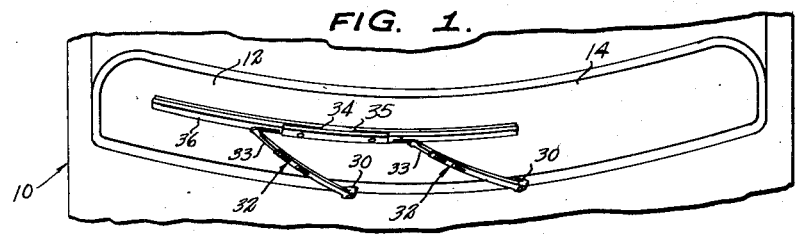
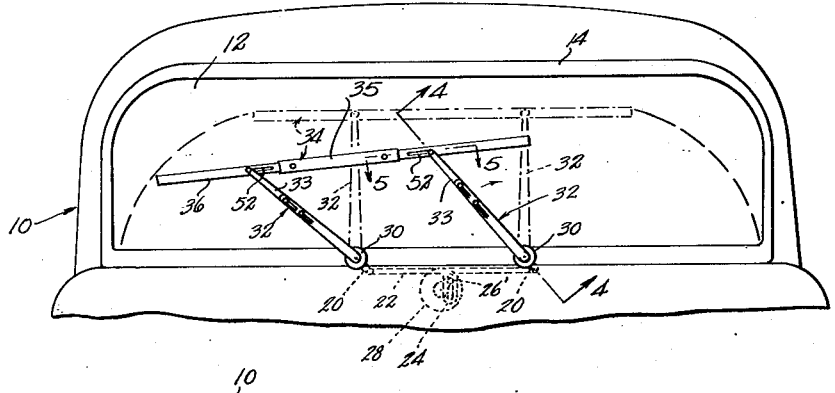
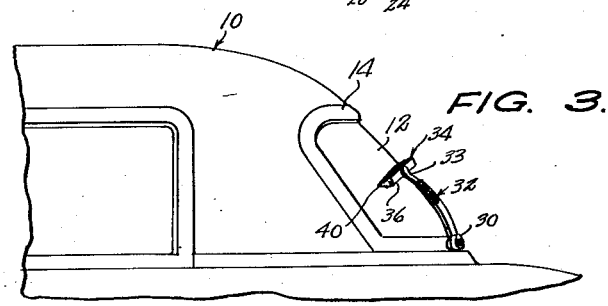
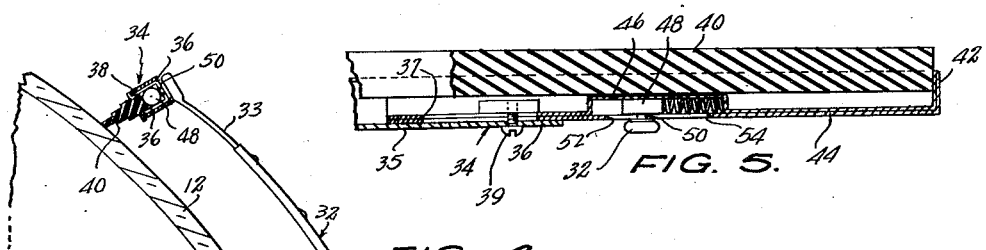
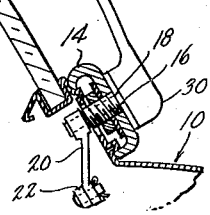
INVENTOR.
DAVID FISKE,
BY
McMorrow, Berman + Davidson
ATTORNEYS.

United States Patent Office 2,795,003
Patented June 11, 1957

---

2,795,003

WINDOW WIPER FOR MOTOR VEHICLES

David Fiske, Los Angeles, Calif.

Application December 5, 1952, Serial No. 324,345

1 Claim. (Cl. 15—255)

This invention relates to improvements in window wipers for motor vehicles of the type having substantially horizontally disposed wiper blades.

A primary object of the invention is to provide generally improved and more efficient horizontal wiper blade structure which can be readily substituted on conventional wiper arm structure for the vertical wiper blade structure usually associated therewith.

Another important object of the invention is to provide wiper blade structure of the character indicated above which is especially applicable to curved windshields and rear windows of vehicles, and which, in its retracted inactive position is inclined so as to drain rain and melted snow therefrom.

Other objects of the invention will appear from the following description, the claims appended thereto, and from the annexed drawing, in which like reference characters designate like parts throughout the several views, and wherein:

Figure 1 is a fragmentary top plan view of an automotive vehicle, showing the rear window of said vehicle, and a wiper assembly in accordance with the present invention associated therewith;

Figure 2 is a fragmentary rear elevational view of said vehicle, showing the rear window in rear elevation, the full and dotted lines showing different positions of the wiper assembly;

Figure 3 is a fragmentary side elevational view of Figure 2;

Figure 4 is an enlarged fragmentary sectional view taken substantially on line 4—4 of Figure 2;

Figure 5 is an enlarged fragmentary sectional view taken substantially on line 5—5 of Figure 2.

Referring in detail to the drawings, and first to Figures 1 to 5 thereof, a vehicle body 10 has a rear window 12 framed by a garnish molding 14.

Formed in the lower part of the garnish molding 14, extending along the bottom edge of the window 12, are spaced openings 16 (Figure 4), with threaded studs 18 extending through said openings. The openings 16, it may be noted, are of smooth walled formation, so as to permit free rotation of the studs 18 therein.

The studs 18 project inwardly of the garnish molding 14, and each stud has fixed on its inner end one end of an arm 20 (Figures 2 and 4). The arms 20 are disposed radially of their associated studs 18, and at their outer ends, are pivotally connected to the opposite ends of a link 22.

Rigid with the midlength portion of the link 22 is a depending plate 24, having a vertical slot 25 disposed normally to the longitudinal center line of the link, and receiving an eccentric pin 26' projecting from the marginal portion of a disc 28. Disc 28 is secured to a drive shaft, the drive shaft being rotated in any suitable manner, either by an electrical motor or by a vacuum motor connected to the vehicle engine manifold, so that the link 22 is reciprocated endwise, responsive to rotation of the disc 28, and reciprocation of said link is, in turn, effective to cause oscillation of the arms 20.

At their outer ends, the studs 18 are fixedly connected to enlarged bases 30 on the lower ends of windshield wiper arms 32.

Each wiper arm 32 includes telescopically related inner and outer members 31 and 33, the outer members being extended to selected adjusted positions beyond the inner members 31.

The wiper arms 32 are connected, at their outer ends, to wiper blade structure designated generally at 34.

The blade structure 34, as will be noted from Figure 2, is disposed approximately horizontally, and is connected at spaced locations along the length thereof to the outer or upper ends of the wiper arms 32.

The blade structure 34 comprises a channel middle section 35 connected at its opposite ends to the inner ends of outer sections consisting of blade holders 36, which can be formed from sheet metal material or the like. Each holder 36 is of channel formation, having side walls 38 adapted to grip between them a wiper blade 40 (see Figure 4).

As shown in Figure 5, the inner ends of the webs 41 of the blade holders 36 have longitudinal slots 37 into which extend fastening elements 39, the fastening element 39 being carried by the web 43 of the member 35, thus to permit the blade holders 36 to be adjustable longitudinally of the member 35, thereby to adjust the overall length of the wiper blade structure 34.

To prevent longitudinal movement of the blades 40 relative to their associated holders, end walls 42 are provided on the holders. As will be noted from Figure 5, the material of which the holders are formed can be folded upon itself to provide the end walls 42, after which the sheet metal material can be extended in contact with the webs 41 of the holders, as at 44.

Intermediate the ends of the holders, inner portions of the webs 41 of the holders are inset to define elongated housings for cylindrical slides.

The cylindrical slides 48 slide longitudinally in their associated housings 46 and are rigid with pins 50 projecting through longitudinal slots 52 formed in the webs 41 of the holders 36 outwardly of the slots 37. Pins 50 are rotatably mounted in the upper ends of the wiper arms 32.

Within the housings 46 are coil springs 54 compressed between the outer ends 55 of the housings and the cylindrical slides 48, which urge the slides toward the inner ends 57 of the housings.

When the wiper arms are disposed medially between the opposite extremes of their oscillating movements, the slides 48 are engaged with the inner ends 57 of the housings 46. The described sliding pivotal connections between the blade structure 34 and the wiper arms 32 permit a certain amount of lost motion, at the opposite extremes of the oscillating movements of the arms 32, so as to cushion movements of the arms during operation of the wiper structure.

As shown in full lines in Figure 2, the wiper blade structure 34 is in inclined position except when the arms 32 are in their middle, vertical positions, it being found that this arrangement aids in drainage of water from the wiper blade structure.

It will be seen from Figure 2 that a wiper blade structure formed as illustrated traverses a substantially greater window area than is covered by a conventional vertical wiper blade structure.

It will be understood that for a curved window or windshield, the wiper blade structure 34 is to be longitudinally curved to conform to the curvature of the window or windshield.

It is believed apparent that the invention is not necessarily confined to the specific use or uses thereof described above, since it may be utilized for any purpose to which it may be suited. Nor is the invention to be necessarily limited to the specific constructions illustrated and described, and intended only to be illustrative of the principles of operation and means presently devised to carry out said principles, it being considered that the invention comprehends any minor change in construction that may be permitted within the scope of the appended claim.

What is claimed is:

In a window wiper, a support, a pair of spaced parallel wiper arms having inner and outer ends, a wiper blade structure extending between and across the outer ends of said arms, said blade structure comprising housings spaced along the blade structure, said housings having walls provided with longitudinal slots and inner and outer ends, slides confined within said housings and movable toward and away from the housing ends, said slides having reduced pins projecting through said slots and secured to the outer ends of the wiper arms, said slots being longer than the slides, and springs in said housings compressed between the outer ends of the housings and the slides, said blade structure comprising a middle section having opposed ends, and blade holder setions secured to the opposed ends of the middle section, said blade holder sections containing said housing and being adjustable longitudinally of the middle section.

References Cited in the file of this patent

UNITED STATES PATENTS

| | | |
|---|---|---|
| 1,515,584 | Hansen | Nov. 11, 1924 |
| 1,660,395 | Perilli | Feb. 28, 1928 |
| 1,946,119 | Van Auken | Feb. 6, 1934 |
| 2,012,313 | Lark | Aug. 27, 1935 |
| 2,144,454 | Folberth | Jan. 17, 1939 |
| 2,607,944 | Turner | Aug. 26, 1952 |